Figure 1:
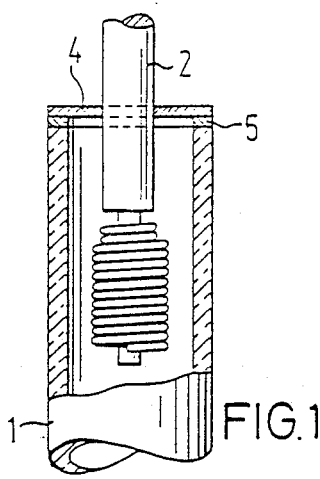

United States Patent [19]

Gradl et al.

[11] Patent Number: 4,892,498
[45] Date of Patent: Jan. 9, 1990

[54] PROCESS FOR VACUUM-TIGHT SEALING OF A CERAMIC TUBE

[75] Inventors: Reinhold Gradl, Rückersdorf; Klaus Popp, Nuremberg, both of Fed. Rep. of Germany

[73] Assignee: Hoechst CeramTec Aktiengesellschaft, Selb, Fed. Rep. of Germany

[21] Appl. No.: 306,357

[22] Filed: Feb. 6, 1989

[30] Foreign Application Priority Data

Feb. 4, 1988 [DE] Fed. Rep. of Germany ....... 3803227

[51] Int. Cl.$^4$ .................................................. H01J 9/26
[52] U.S. Cl. ....................................... 445/44; 228/124; 427/383.5
[58] Field of Search ................ 228/124, 263.12, 903; 427/383.5; 445/44

[56] References Cited

U.S. PATENT DOCUMENTS

| | | | |
|---|---|---|---|
| 3,023,492 | 3/1962 | Bristow | 427/383.5 |
| 3,281,931 | 11/1966 | Ritz | 228/124 |
| 3,289,291 | 12/1966 | Reed | 228/124 |
| 3,395,993 | 8/1968 | Bristow | 228/903 X |
| 3,866,280 | 2/1975 | Barakitis | 228/903 X |
| 4,160,930 | 7/1979 | Driessen et al. | 313/217 |
| 4,763,828 | 8/1988 | Fukaya et al. | 228/124 |

FOREIGN PATENT DOCUMENTS

| | | |
|---|---|---|
| 999918 | 11/1976 | Canada . |
| 0186348 | 9/1986 | European Pat. Off. . |
| 2156147 | 10/1985 | United Kingdom . |

OTHER PUBLICATIONS

Dietzel, "Zum Haftmechanismus von Molybdän/Mangan-Metallisierungsschichten auf Korundkeramik, Teil I: Reaktionsmechanismus und Haftung", Berichte der Deutschen Keramischen Gesellschaft e.V., pp. 405–444, (1965).

Meyer, "Zum Haftmechanismus von Molybdän/Mangan-Metallisierungsschichten auf Korundkeramik Teil II: Die Metallisierung SiO$_2$-armer Korundkeramik", Berichte der Deutschen Keramischen Gesellschaft e.V., pp. 452–454, (1965).

*Primary Examiner*—Kenneth J. Ramsey
*Attorney, Agent, or Firm*—Foley & Lardner, Schwartz, Jeffery, Schwaab, Mack, Blumenthal & Evans

[57] ABSTRACT

Cylindrical tubes of translucent alumina ceramic, which have metallic current bushings at the ends, are sealed vacuum-tight. For this purpose, a metallizing paste which contains (a) at least one finely dispersed metal powder composed of tungsten, molybdenum, niobium or tantalum,
(b) a liquid organic binder and
(c) a pulverulent calcium-magnesium silicate having a melting point in the range of 1200°–1500° C., is applied to the ends of the tube, the paste is burned in on the alumina ceramic and a thin metal layer is thus produced, a further layer of nickel or copper is deposited chemically or by electroplating on the metal layer remaining after the burning-in, metallic current bushings are inserted into the tube in the region of the tube ends, and the ends are sealed in the metallized areas by means of a brazing solder having a melting point between 950° and 1200° C., for example a Cu/Ag alloy, if necessary with the use of disk-shaped gasket elements.

18 Claims, 1 Drawing Sheet

PROCESS FOR VACUUM-TIGHT SEALING OF A CERAMIC TUBE

The present invention relates to a process for vacuum-tight sealing of a tube of translucent alumina ceramic by means of a metallic seal which contains a metallic current bushing. A process for producing a fluorescent tube is already known from German Offenlegungsschrift No. 3,507,105, wherein a current lead is pushed into a monolithic, light-transmitting ceramic tube and the orifice is then sealed with a melting sealing compound. The sealing compound which can be used is not stated in detail. It is a disadvantage of this process that it is restricted to monolithic tubes. In fact, in the case of cylindrical tubes, the internal diameter of which at the tube ends is markedly greater than the current bushing, not only the problem of making a current bushing/cover seal but also that of making a cover/cylindrical tube seal has to be solved.

In German Offenlegungsschrift No. 2,641,880, a ceramic solder bond based on $Al_2O_3$, CaO, MgO, $B_2O_3$ and $SiO_2$ has been described for vacuum-tight sealing between the ceramic and the metal partner. Its expansion behavior is said to approach that of the $Al_2O_3$ tube.

For sealing non-translucent tubes of $Al_2O_3$ of a purity of less than 99%, which show small crystallite grain sizes, metallizing pastes have already been used which contain molybdenum and a manganese silicate, which reacts with the tube material to form a spinel. However, the adhesive strength of this bond decreases with increasing crystallite size of the $Al_2O_3$ and is slight in the case of translucent $Al_2O_3$. When the sealing compounds described in the state of the art are used, seal defects which cause failure of the lamps occur again and again.

Such defects are:
 (a) Poor adhesion of the molten ceramic sealing compound to the metal partner.
 (b) Chemical reaction of the melt with the metal partner, as a result of which the sealing compound crystallizes out.
 (c) Microcracks during operation of the lamp, due to the different expansion behavior of ceramic, metal partner and sealing compound.
 (d) Chemical attack on the sealing compound by Na.

In a number of publications, attempts have been made to counteract these sealing problems.

According to the proposal of German Offenlegungsschrift No. 2,437,774, a ceramic sealing compound is entirely omitted and the metallic current bushing takes on the task of making a seal between the $Al_2O_3$ tube and a ceramic sealing disk. For this purpose, the current lead is formed from a molybdenum foil which is sintered in between the tube and the disk.

Nevertheless, absolutely reliable sealing of the ceramic/metal bond in discharge lamps of translucent alumina was still lacking.

A process for vacuum-tight sealing of a cylindrical tube of translucent alumina ceramic by means of a metallic seal containing a metallic current bushing has now been found, which comprises
1. applying to the ends of the tube a metallizing paste which contains
   (a) at least one finely dispersed metal powder, selected from the group comprising tungsten, molybdenum, niobium and tantalum,
   (b) a liquid organic binder and
   (c) a pulverulent Ca-Mg silicate having a melting point in the range from 1200° to 1500° C.,
2. producing a thin metal layer on the alumina ceramic by burning the paste in,
3. after burning-in, depositing a further layer of metallic nickel or copper on the remaining thin metal layer,
4. inserting a metallic current bushing into the tube in the region of the tube ends and sealing the ends vacuum tight in the metallized areas by means of a brazing solder having a melting point between 950 and 1200° C., if necessary with the use of disk-shaped gasket elements.

For the metallization of highest-purity and virtually $SiO_2$-free corundum ceramic, it is already known to fuse on a mixture of molybdenum powder and manganese silicate (Ber. d. deut. Ker. Ges., 1965, page 452). The alumina ceramic used there contained less than 0.01% of $SiO_2$. The lower the glass phase content in the $Al_2O_3$, the more difficult it is usually to anchor the metallizing layer. Translucent, highly pure $Al_2O_3$ is therefore difficult to metallize.

For the process according to the invention, an $SiO_2$ content in the $Al_2O_3$ is not necessary at all. What is more, parts of low $SiO_2$ content (for example 10 ppm of $SiO_2$ as a maximum) or 10 to 50 ppm of $SiO_2$ can be metallized.

The grain size of the metal powder should not be greater than 4 micrometers. The finer the powder, the better it sinters together and the easier it is to produce a thin metal layer on burning-in. A grain size distribution between 0.5 and 2.5 $\mu$m has proved suitable. The best behavior is shown by tungsten, and molybdenum is almost as good.

The liquid organic binder can be free of solvent. In this case, it is possible to use, for example, low-condensed phenol-formaldehyde resins. Anhydrous solutions of an organic binder in an organic solvent are preferred. Binders which are soluble in organic solvents are preferred, for example phenolic resins, acrylic resins, phthalate resins, nitrocellulose coatings, polyvinyl acetals and polyvinyl ethers. The drying rate of the applied paste can be controlled by the evaporation number of the solvent (examples: 2.1 for acetone; 190 for butyl glycol acetate).

The binder is intended temporarily to bond the components to the alumina tube before burning, and it is intended to decompose or volatilize during burning-in. Further binders having this property are colophony, alkyd resins, cellulose derivatives, coumarone-indene resins, epoxide resins, furan resins, isocyanate resins, unsaturated polyesters, urea resins, vinyl resins and melamine resins.

The organic solvent for the binder is not critical. Solvents which readily evaporate are preferred, since this allows rapid working. Solutions of the binder in alcohol are preferred.

The grain size of the pulverulent calcium-magnesium silicate should be less than 15 $\mu$m, in particular in the range of 1–3 pm. Contents of 50–70% by weight of $SiO_2$, 20–40% of CaO and 5–15% of MgO in the frit are advantageous. In addition to metal powder, silicate and binder, the paste can advantageously also contain proportions of up to 4%, in particular 0.5–3% by weight, of $TiO_2$. The quantitative proportions of the components of the metallizing paste can vary within wide limits. A metal powder/silicate ratio of 65:35 to 95:5, in particular 75:25 to 95:5, is preferred. The proportion by weight of the liquid organic binder is about 5 to 30% by weight.

The paste is applied in a thickness of 5-30 μm, preferably 10-20 μm, for example by screen printing or by brushing stripes. The well-adhering, highly vacuum-tight metal layer produced therefrom during sintering-on has approximately the same thickness.

The burning-in of the metallizing layer should be carried out in the absence of oxygen. A nitrogen/hydrogen atmosphere containing 10-40% by volume of $H_2$, the remainder being nitrogen, has proved suitable. For complete removal of binder and for obtaining good adhesive strengths, it is advantageous for this atmosphere also to have a small water content, the dew point of the humid atmosphere being in particular 10° to 40° C. The burning-in of the metallizing paste is carried out at temperatures which are above the melting point of the pulverulent silicate, but below the sintering temperature of alumina ceramic (about 1750° C.).

Since the directly burned-in metal layer is not readily wetted by brazing solder, it is appropriate to reinforce it by a further metal layer of nickel or copper. Nickel can be deposited, for example, by applying a nickel oxide paste, followed by burning-in in the reducing atmosphere, or better by an electrolytic method. Chemical nickel-plating is also possible. Copper can also be deposited chemically, but even better by electroplating.

The reinforcement of a burned-in metallization by means of a nickel layer is known from Berichte der Deutschen Keramischen Gesellschaft 1965, page 405.

The brazing solder used, having a melting point of 950° to 1200° C., can be composed, for example, of copper, of silver or of a copper/silver alloy, copper/nickel alloy or a palladium alloy. Copper/silver/palladium alloys are preferred. Since temperatures of up to 900° C. can occur at the ends of the burner tubes during operation of the lamp, solders having a melting point of at least 1000° C. are preferred.

It is advantageous if the soldering-in is carried out in vacuo (about 0.0001 mbar) or under a blanketing gas, so that the metallizing layer is not oxidized.

The current bushing is a metal tube or a metal wire, the diameter of which is smaller by up to 0.5 mm, in particular up to 0.2 mm, than that of the internal diameter of the end of the $Al_2O_3$ tube or of the gasket element of metal applied there. Diameters of 1 to 5 mm, in particular 1.5 to 3.5 mm, are usual. At the end protruding into the interior of the ceramic tube, the current bushing can in most cases carry a coil-shaped electrode, such as is illustrated, for example, in German Offenlegungsschrift No. 3,009,561.

Figure 2:
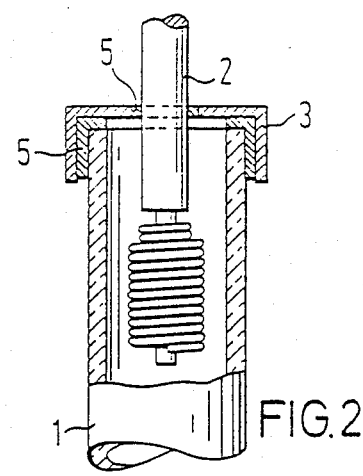
Figure 4:
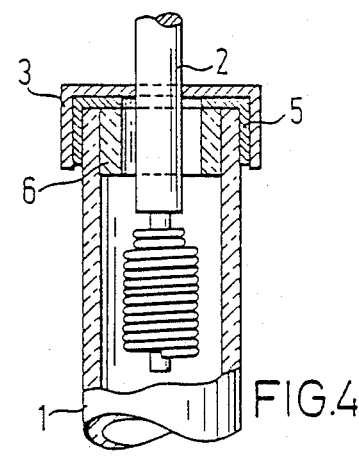

If the end of the tube is markedly wider than the current bushing, it is advantageous and easier to seal the tube in the region of the ends by means of soldering-on a disk-shaped gasket element, for example a metal disk or metal cap. In the case of metal disks, only the end faces of the tube are metallized. In the case of caps, the outsides of the tube are metallized in the region of the ends, and sometimes also the end faces. Tube ends sealed in this way are shown in FIGS. 2 and 4. Because of the greater soldering area, the cap provides a more reliable seal than a disk.

The gasket element of metal can have a small hole in the middle, through which the current bushing is later pushed in and soldered in. However, the current bushing and gasket element can be produced integrally. This embodiment is shown in FIGS. 1 and 4. 1 is here the alumina tube, 2 is the current bushing, 3 is a cap-shaped gasket element of metal, 4 is a disk-shaped gasket element of metal and 5 is the metal solder. In the figures, the quantity of metal solder is shown exaggerated, in the metallization (between alumina and solder) is not drawn.

Suitable materials for the gasket element (and also for the current bushing) are high-melting metals, such as tungsten, molybdenum, niobium, tantalum or special iron/nickel/cobalt alloys, for example Vacon, which are known to those skilled in the art. The gasket elements have a thickness of 0.5-2 mm. The diameter is slightly greater than the diameter of the discharge vessel.

For firm soldering of the gasket element (3 or 4) to the tube, the same brazing solder (5) can be used as for soldering the current bushing in. It is appropriate for the solder used for the first soldering to have a higher melting point than that for the second soldering.

Figure 5:
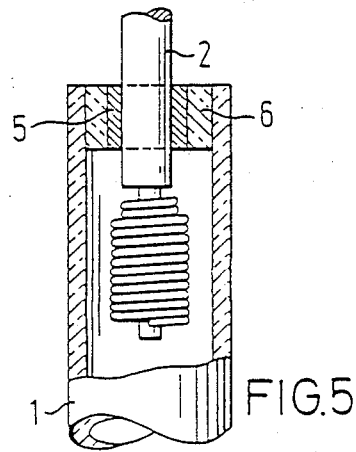

Alternatively, it is possible to make the internal diameter of a wide tube still somewhat narrower, before it is sealed. For this purpose, it is possible, before the metallization, to insert a close-fitting short tube piece of high-percentage $Al_2O_3$ ceramic into the interior of the tube in the region of the tube end, and to sinter it in. The narrowed tubes can be metallized either on the end face (FIG. 3), on the end face and the outside (FIG. 4) or only on the inside (FIG. 5).

Figure 3:
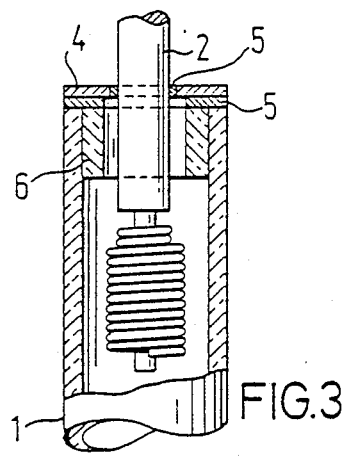

As a result of narrowing the tube, the bearing area of the metal disk 4 in FIG. 3 or of the metal cap 3 in FIG. 4 and hence the sealing area are enlarged.

If a metal cap or metal disk is used, the inner part and the outer part of the current bushing will in most cases lie on a straight line. Such a system can be formed, for example, by turning out of a cylindrical block of metal or by soldering a continuous current bushing into an orifice in the disk. It is also possible for the outer part of the current lead to be soldered to the outside and for the inner part to be soldered to the inside of the unperforated gasket element.

If, after the narrowing of the cross-section, the internal diameter is then only slightly greater than the external diameter of the current bushing, a metal cap or metal disk can be omitted. In this case, it is sufficient to metallize the inside of the narrowed ceramic tube and to solder the current bushing in. A tube end, which has been sealed by this procedure, is shown in FIG. 5.

Figure 6:
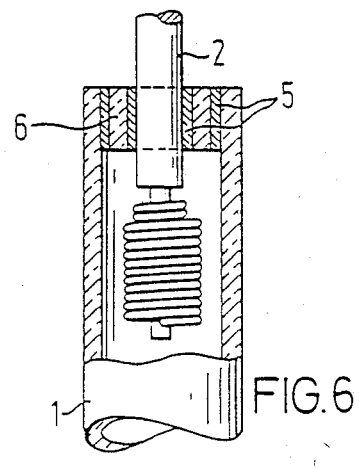

The narrowing of an alumina tube metallized on the inside can also be effected by metallizing a close-fitting short tube piece of high-percentage alumina ceramic on the outside and simultaneously on the inside. "High-percentage alumina ceramic" here means a ceramic containing at least 99% by weight of $Al_2O_3$, which can but does not have to be translucent. The external diameter of this tube piece corresponds approximately to the internal diameter of the alumina tube. The short tube piece is inserted into the translucent alumina tube in the region of the tube end and soldered in by means of the brazing solder. At the same time, a current bushing is soldered into the interior of the tube piece, and the tube is thus sealed. When solders having different melting points are used, the soldering-in of the current bushing and inner tube can also be carried out successively. The end of a ceramic tube, which was sealed vacuum-tight in this way, is shown in FIG. 6.

In all the embodiments, a disk (of high-percentage $Al_2O_3$) can be sintered in on the insides of the end faces. Such disks (in a non-planar form) are known from European Patent No. 186,348. They are intended to protect the metallic covering and the soldered bond from direct radiant heat and additionally from direct attack by sodium.

It is an advantage of the Ca-Mg silicate used that it has a high softening range (1350–1500° C.) which is not reached during soldering. It has excellent adhesion to the $Al_2O_3$ tube and to the metal. Its coefficient of thermal expansion approaches that of $Al_2O_3$, so that hardly any thermal stresses arise. Moreover, it is not attacked by sodium vapor, even after a prolonged period.

The process according to the invention is very suitable for vacuum-tight and durable sealing of burner tubes of sodium high-pressure lamps and sodium low-pressure lamps. In translucent $Al_2O_3$ tubes, the content of pure $Al_2O_3$ is always more than 99.7% and the crystallite size is greater than 20 μm. Even though difficulties frequently arise under conventional conditions, because the hitherto used sealing material does not wet the current bushing, tight seals can be made by the process according to the invention. The spalling resistance of the seal is higher than in the case of manganese silicate.

Adhesive strengths of more than 100 $N/mm^2$ (tested on a special test specimen and with uniaxial draw) between translucent $Al_2O_3$ and a metal partner can be achieved by means of the process according to the invention.

The invention is explained by means of the example.

EXAMPLE (a) A translucent alumina tube of about 10 cm length, 5 mm internal diameter and 1 mm wall thickness is used for producing a high-pressure sodium vapor lamp. The content of pure alumina is 99.9% by weight, and the mean grain size of the sintered tube is 20 μm. Tubes having grain sizes of 40 μm give almost equally good results.

(b) A mixture of 102 g of $SiO_2$, 96.5 g of $CaCO_3$ (corresponding to 54 g of CaO) and 14 g of MgO is ground and then fritted at a temperature of 1500° C. The comminuted frit is mixed with 830 g of sieved tungsten powder. The mixture is ground until the mean grain size is less than 5 microns. 1.3 g of $TiO_2$ are also added to the batch. The powder is dispersed in 180 g of a resin-containing coating system based on a nitrocellulose coating, which also contains 20 g of amyl acetate as a volatile diluent. The viscosity of the resulting paste is 500–600 P (=50–60 Pa . s). This finely dispersed paste is applied by means of screen printing to the end faces of the ceramic burner tube. The layer thickness varies between 10 and 20 μm.

(c) For sintering the metallizing layer, the tubes are deposited on V-shaped molybdenum sheets and heated to 1500° C. in the burning furnace. The burning atmosphere contains 82% of nitrogen, the remainder being moist hydrogen. The dew point is 10° C.

(d) To improve wetting by the brazing solder, the sintered-on metallization is electroplated with nickel for 10 minutes at a current intensity of 10 A. A nickel layer of 1 μm is thus applied.

(e) A 0.3 mm thick solder ring of Cu/Pd/Ag is placed simultaneously on each of the two metallized end faces of the tube. A metallic sealing disk of Vacon (54Fe28Ni18Co; thickness 1 mm), the diameter of which is somewhat greater than the diameter of the discharge vessel, is then placed upon each solder ring. The oxide tube is put into a vertical position and the lower disk is prevented from falling out by a high temperature-resistant support. The oxide tube and support migrate through a continuously operated tunnel furnace. The disks are thus soldered to the $Al_2O_3$ tube. The disks have a central bore which is greater by about 0.3 mm than the current bushing which is later inserted. The soldering temperature is 1105° C. Soldering under a high vacuum ensures a pore-free bond.

(f) A solder ring is then placed upon the two ends of the tube in the region of the bores of the sealing disks, and the current bushing made in the form of a tube is then inserted into the bore and the tube end is sealed by the soldering process described. One current bushing is made in the form of a tube with a lateral hole in the interior of the burner tube. After soldering, the tube is evacuated and filled with Na amalgam and sealed by pinching.

The adhesive strength between the translucent alumina and the metal disk is more than 100 $N/mm^2$ in the tube thus produced.

We claim:

1. A process for vacuum-tight sealing of a cylindrical tube of translucent alumina ceramic, using a metallic current bushing, which comprises
   (1) applying to the ends of the tube a metallizing paste which contains
      (a) at least one finely dispersed metal powder, selected from the group comprising tungsten, molybdenum, niobium and tantalum,
      (b) a liquid organic binder and
      (c) a pulverulent calcium-magnesium silicate having a melting point in the range 1200–1500° C.,
   (2) producing a thin metal layer on the alumina ceramic by burning the paste in,
   (3) after burning-in of the metallizing paste, depositing a further layer of nickel or copper on the remaining metal layer,
   (4) inserting metallic current bushings into the tube in the region of the tube ends and sealing the ends vacuum-tight in the metallized areas by means of a brazing solder having a melting point between 950° and 1200° C., if necessary with the use of disk-shaped gasket elements.

2. The process as claimed in claim 1, wherein the deposition of nickel and copper is carried out by electroplating.

3. The process as claimed in claim 1, wherein the calcium-magnesium silicate contains 50–70% by weight of $SiO_2$, 20–40% by weight of CaO and 5–15% by weight of MgO.

4. The process as claimed in claim 3, wherein the calcium-magnesium silicate is virtually free of boron and/or aluminum.

5. The process as claimed in claim 1, wherein the burning-in of the metallizing layer takes place in a nitrogen/hydrogen atmosphere.

6. The process as claimed in claim 5, which is carried out in a moist hydrogen atmosphere.

7. The process as claimed in claim 6, wherein the dew point of the moist hydrogen atmosphere is 10° to 40° C.

8. The process as claimed in claim 1, wherein the brazing solder used is selected from the group comprising copper and silver.

9. The process as claimed in claim 1, wherein the brazing solder is a copper/silver alloy.

10. The process as claimed in claim 9, wherein the brazing solder employed is a copper/silver/palladium alloy.

11. The process as claimed in claim 1, wherein a disk or cap of a refractory metal is soldered to the metal layer by means of the brazing solder and the alumina tube is sealed vacuum-tight in this way.

12. The process as claimed in claim 11, wherein the soldered-on disk or cap is provided with a current bushing.

13. The process as claimed in claim 11, wherein the disk or cap is composed of tungsten, molybdenum, niobium, tantalum or an iron/nickel/cobalt alloy.

14. The process as claimed in claim 1, wherein the soldering-in is carried out at temperatures above 950° C. in vacuo or under a blanketing gas.

15. The process as claimed in claim 1, which comprises, before the metallization, inserting a close-fitting short tube piece of high-percentage $Al_2O_3$ ceramic into the interior of the tube in the region of the tube end, in order to narrow the cross-section, and sintering it in, metallizing the sintered-in tube piece on the inside, inserting the metallic current bushing into the metallized inner bore without using a metal disk or cap, and soldering it in vacuum-tight.

16. The process as claimed in claim 1, which comprises, before the metallization, inserting a close-fitting short tube piece of high-percentage $Al_2O_3$ ceramic into the interior of the tube in the region of the tube end, in order to narrow the cross-section, and sintering it in, metallizing the tube piece and tube on the end face and soldering a metal disk or metal cap of a refractory metal with a current bushing vacuum-tight to the metal layer at the end face by means of brazing solder.

17. The process as claimed in claim 1, which comprises metallizing the $Al_2O_3$ tube on the inside in the region of the tube ends, metallizing a close-fitting short tube piece of high-percentage $Al_2O_3$ ceramic, the external diameter of which approximately corresponds to the internal diameter of the $Al_2O_3$ tube, on the outside and inside, inserting the tube piece into the translucent $Al_2O_3$ tube, metallized on the inside, in the region of the tube end and soldering it in by means of the brazing solder, soldering a current bushing into the interior of the short tube piece, after the latter has been metallized, and thus simultaneously sealing the tube.

18. The process as claimed in claim 1 wherein the calcium-magnesium silicate is virtually free of boron and/or aluminum.

* * * * *